United States Patent [19]
Jones et al.

[11] Patent Number: 5,667,034
[45] Date of Patent: Sep. 16, 1997

[54] POWER STEERING SYSTEM

[75] Inventors: Neil Jones, Palm City; Mark D. Morris, Stuart, both of Fla.

[73] Assignee: TRW Inc., Lyndhurst, Ohio

[21] Appl. No.: 212,242

[22] Filed: Mar. 14, 1994

[51] Int. Cl.$^6$ ............................................. B62D 5/06
[52] U.S. Cl. .............................. 180/422; 91/375 A
[58] Field of Search ................................ 180/132, 140, 180/141, 146, 147, 148, 152, 79.1, 142; 280/773, 89, 90; 91/371, 375 A

[56] References Cited

U.S. PATENT DOCUMENTS

| | | | |
|---|---|---|---|
| 2,865,462 | 12/1958 | Milliken et al. | 180/143 |
| 3,011,579 | 12/1961 | Milliken, Jr. et al. | 180/142 |
| 4,047,728 | 9/1977 | Takahashi et al. | 180/141 |
| 4,633,963 | 1/1987 | Hasegawa | 180/143 |
| 4,666,013 | 5/1987 | Shibahata et al. | 180/142 |
| 4,691,797 | 9/1987 | Miller | 180/141 X |
| 4,811,806 | 3/1989 | Lang | 180/141 |
| 4,858,712 | 8/1989 | Neff | 180/143 |
| 5,058,696 | 10/1991 | Prebay et al. | 180/141 |
| 5,070,956 | 12/1991 | Pawlak et al. | 180/132 |
| 5,070,957 | 12/1991 | Harkrader et al. | 180/141 |
| 5,092,418 | 3/1992 | Suzuki et al. | 180/132 |
| 5,135,068 | 8/1992 | Emori et al. | 180/132 |
| 5,184,691 | 2/1993 | Leutner | 180/132 |
| 5,291,963 | 3/1994 | Sangret | 91/371 |
| 5,293,954 | 3/1994 | Dymond | 180/141 |
| 5,339,917 | 8/1994 | Eberhart | 180/143 |
| 5,357,845 | 10/1994 | Sangret | 91/375 A |
| 5,392,875 | 2/1995 | Duffy | 180/141 X |

*Primary Examiner*—Kevin Hurley
*Attorney, Agent, or Firm*—Tarolli, Sundheim, Covell, Tummino & Szabo

[57] ABSTRACT

A vehicle power steering motor (31) provides a force to turn vehicle steerable wheels (14 and 16). A power steering control valve (22) includes first and second relatively rotatable valve members (40 and 42). The first and second valve members (40 and 42) port fluid to actuate the vehicle power steering motor (31) upon relative movement. A device (114) senses at least one vehicle operational characteristic and provides a signal indicative of the at least one vehicle operational characteristic. In a preferred embodiment, the at least one vehicle operational characteristic is vehicle lateral acceleration. A force transmitting device (116, 120, and 130) resists relative movement between the first and second valve members (40 and 42) with a force which varies as a function of the output signal. The force varies as a function of vehicle lateral acceleration.

10 Claims, 5 Drawing Sheets

POWER STEERING SYSTEM

BACKGROUND OF THE INVENTION

The present invention relates to a vehicle power steering system and more specifically to a hydraulic vehicle power steering system in which the resistance to actuation of a power steering control valve varies with changes in vehicle lateral acceleration.

A known power steering control valve has an inner valve member which is coaxial with and rotatable relative to an outer valve member or sleeve. To effect actuation of a power steering motor to turn steerable vehicle wheels, the inner valve member is rotated relative to the outer valve member against the influence of a torsion bar. Since actuation of the control valve is resisted by only the torsion bar, the resistance to actuation of the valve does not vary. Also, it is known to increase the resistance felt by an operator of a vehicle to actuation of a power steering system as vehicle speed increases.

SUMMARY OF THE INVENTION

The present invention provides a new and improved apparatus for use in a vehicle to control the operation of a power steering motor. The apparatus includes first and second valve members which are relatively movable to port fluid to a vehicle power steering motor. A means senses at least one vehicle operational characteristic and provides an output signal which is indicative of the at least one vehicle characteristic. In a preferred embodiment, the at least one vehicle operational characteristic is vehicle lateral acceleration. A force transmitting means resists relative movement between the first and second valve members with a force which varies as a function of the output signal. The force varies proportionate to vehicle lateral acceleration.

BRIEF DESCRIPTION OF THE DRAWINGS

The foregoing and other features of the present invention will become apparent to one skilled in the art upon reading the following description with reference to the accompanying drawings wherein.

DESCRIPTION OF A PREFERRED EMBODIMENT OF THE INVENTION

Power Steering System—General Description

A vehicle power steering system 12 (FIG. 1) is operable to turn steerable vehicle wheels 14 and 16 upon rotation of a steering wheel 18 by an operator of the vehicle. Rotation of the steering wheel 18 actuates a power steering control valve 22 to port fluid from an engine driven pump 24 and supply conduit 26 to either one of a pair of motor conduits 28 and 30. The high pressure fluid conducted from the supply conduit 26 through one of the motor conduits 28 or 30 effects operation of a power steering motor 31 to turn the steerable vehicle wheels 14 and 16. Fluid is conducted from the motor 31 to the reservoir 32 through the other one of the motor conduits 28 or 30, the power steering control valve 22, a return conduit 34 and a lateral acceleration responsive control unit 36.

The power steering control valve 22 (FIG. 2) includes an inner valve member 40 and an outer valve member or sleeve 42. The outer valve member 42 is cylindrical and encloses the inner valve member 40. The inner valve member 40 and outer valve member 42 are rotatable relative to each other and to a housing 44 about a common central axis 46. The inner valve member 40 and the outer valve member 42 have an initial, neutral position relative to each other.

Figure 2:
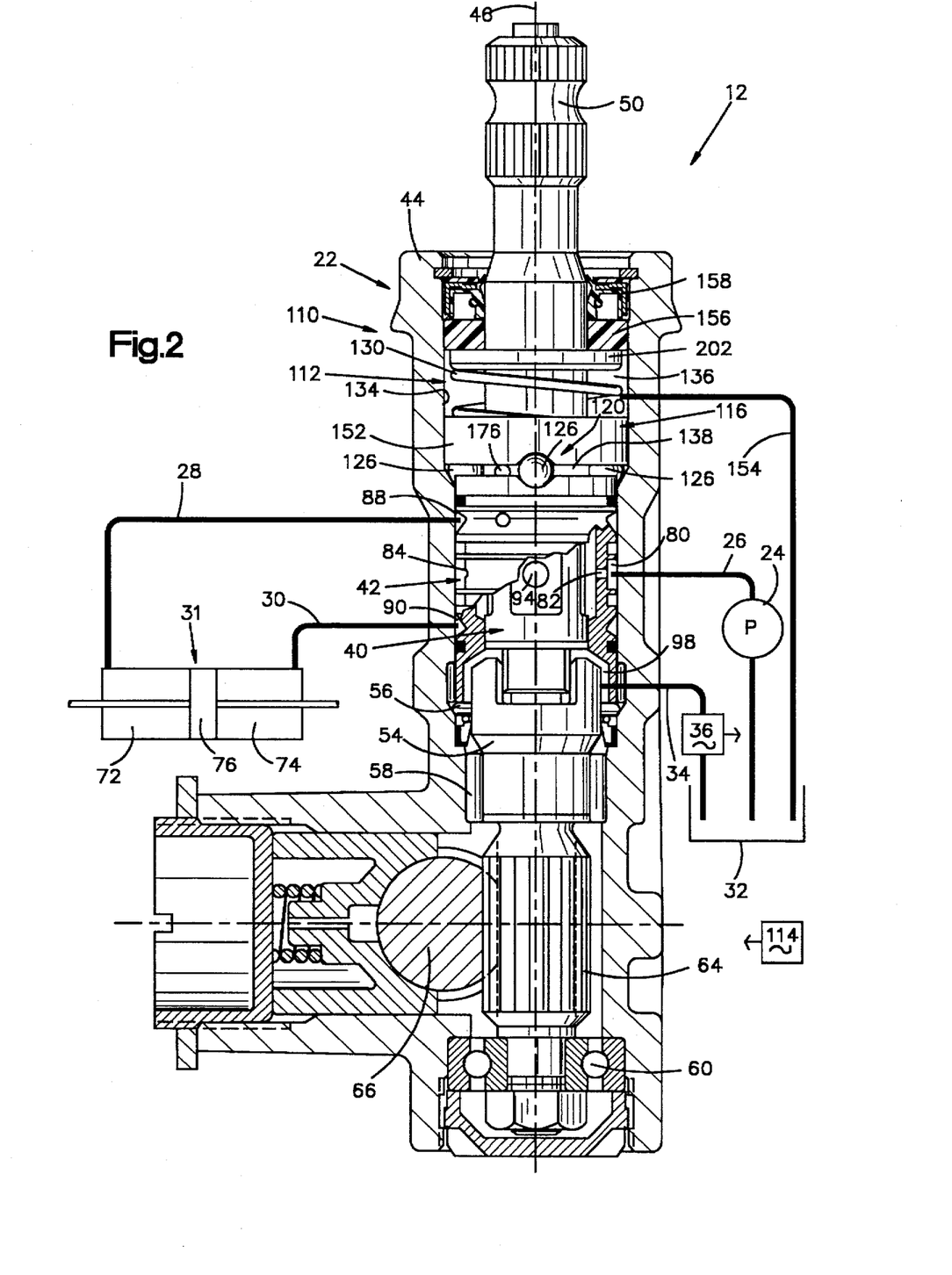
FIG. 2 is an enlarged sectional view of a power steering control valve used in the power steering system of FIG. 1.

Fluid pressure from the pump 24 is conducted to an annular central groove 80 formed in the outer valve member 42. Fluid flows to the outside of the cylindrical outer valve member 42 through a pair of diametrically opposite passages 82 and 84. The inner valve member 40 has a generally square cross sectional configuration with rounded corners which cooperate with axially extending grooves formed inside the outer valve member 42. The ends of one pair of diametrically opposite grooves on the inside of the outer valve member 42 are connected in fluid communication with an annular outer groove 88 connected with the motor conduit 28. A second pair of diametrically opposite and axially extending grooves on the inside of the outer valve member 42 are connected in fluid communication with an annular outer groove 90 formed in the outer valve member and connected with the motor conduit 30.

A pair of diametrically opposite openings 94 extend radially inwardly to an axially extending central passage 96 (FIG. 4) in the inner valve member 40. The central passage 96 is connected in fluid communication with a chamber 98 (FIG. 2) at the lower end of the outer valve member 42. The chamber 98 is connected in fluid communication with the reservoir 32 by the return conduit 34.

Figure 1:
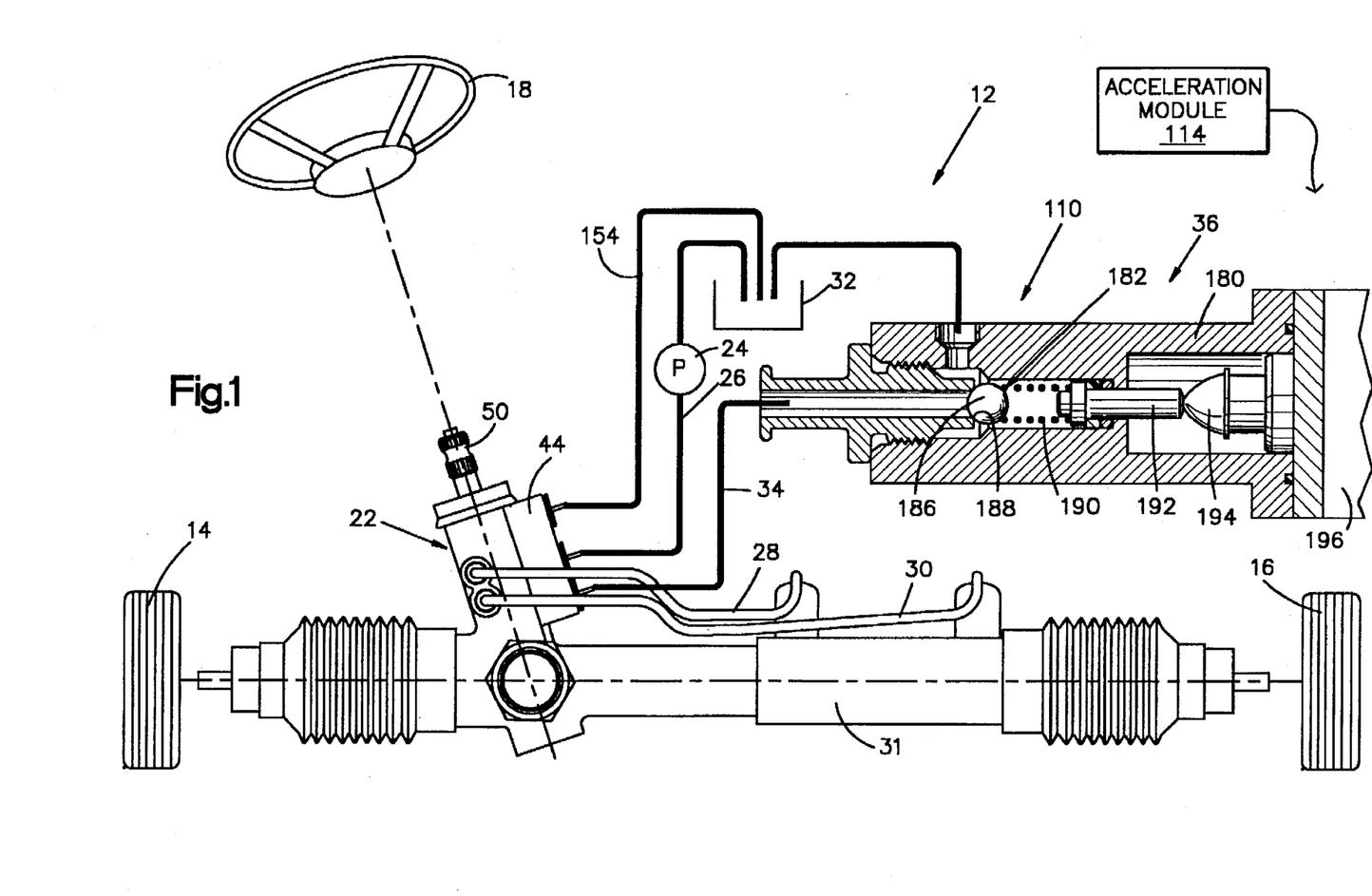
FIG. 1 is a schematic illustration of a vehicle power steering system which is constructed and operated in accordance with the present invention.

The inner valve member 40 is formed as one piece with a cylindrical input member or valve stem 50 which is connected with the steering wheel 18 (FIG. 1). The one piece outer valve member 42 (FIG. 2) is connected with a follow-up member 54 by a pin 56. The follow-up member 54 is rotatably supported in the housing 44 by bearings 58 and 60.

The inner and outer valve members 40 and 42 are interconnected by a torsion bar 102 (FIGS. 4, 5 and 7) which is disposed in the axially extending return fluid passage 96. One end of the torsion bar 102 is connected to the valve stem 50 and the opposite end of the torsion bar is connected to the follow-up member 54. The torsion bar 102 twists to enable relative rotation between the inner and outer valve members 40 and 42 to occur and when free urges the inner and outer valve members 40 and 42 to their relative neutral positions.

The follow-up member 54 has a pinion gear 64 which is disposed in meshing engagement with a rack 66. The rack 66 is connected with the power steering motor 31 and steerable vehicle wheels 14 and 16 (FIG. 1). Movement of the piston 76 (FIG. 2) of the power steering motor 31 drives the rack 66 to move along its longitudinal axis. Movement of the rack 66 turns the steerable vehicle wheels 14 and 16 (FIG. 1).

The power steering control valve 22 (FIG. 2) is of the open center type. Therefore, when the power steering control valve 22 is in an initial or unactuated condition, fluid pressure from the pump 24 is conducted equally to the motor conduits 28 and 30 and equally to motor cylinder chambers 72 and 74 on opposite sides of a piston 76 in the power steering motor 31. Also, fluid flow from the pump 24 is directed by the power steering control valve 22 to the return conduit 34 and reservoir 32.

Upon rotation of the steering wheel 18 and rotation of the valve stem 50, the inner valve member 40 is rotated about the axis 46 relative to the housing 44 and relative to the outer valve member 42 from the neutral position. This directs high pressure fluid from the pump 24 to one of the motor conduits 28 or 30 and directs fluid from the other motor conduit to the reservoir 32.

For example, rotation of the inner valve member 40 in one direction relative to the outer valve member 42 will reduce the extent of communication of the motor conduit 28 with the reservoir 32 and increase the extent of communication of the motor conduit 28 with the pump 24. This results in high pressure fluid from the pump 24 being conducted to the motor cylinder chamber 72. This high pressure fluid moves the piston 76 toward the right (as viewed in FIG. 2). As the piston 76 moves toward the right (as viewed in FIG. 2), fluid discharged from the chamber 74 is conducted through the motor conduit 30, through the power steering control valve 22, through the return conduit 34 toward the reservoir 32.

As the power steering motor 31 operates, the rack 66 rotates the pinion 64 and follow-up member 54. This rotates the outer valve member 42 relative to the inner valve member 40. When the power steering motor 31 is operated to turn the steerable vehicle wheels 14 and 16 to an extent corresponding to the extent of rotation of the inner valve member 40, the rack 66 rotates the pinion 64 through a distance sufficient to move the outer valve member 42 to its neutral position relative to the inner valve member 40. When this occurs, the fluid pressures in the motor cylinder chambers 72 and 74 equalize and the motor 31 stops operating.

Power Steering Resistance Control System

A power steering resistance control system 110 includes three major components, that is, the lateral acceleration responsive control unit 36, a pressure responsive control unit 112 disposed in the power steering control valve housing 44 (FIGS. 2 and 3) and an acceleration module 114 (FIGS. 1 and 2).

The pressure responsive control unit 112 (FIGS. 2 and 3) includes an annular force transmitting member or slider 116 which is disposed in the power steering control valve housing 44. The force transmitting member 116 is coaxial with and circumscribes the valve stem 50. The force transmitting member 116 rotates about the central axis 46 with the inner valve member 40 and valve stem 50. Although the force transmitting member 116 rotates with the inner valve member 40 and valve stem 50, the force transmitting member 116 is movable axially along the valve stem 50.

Figure 3:
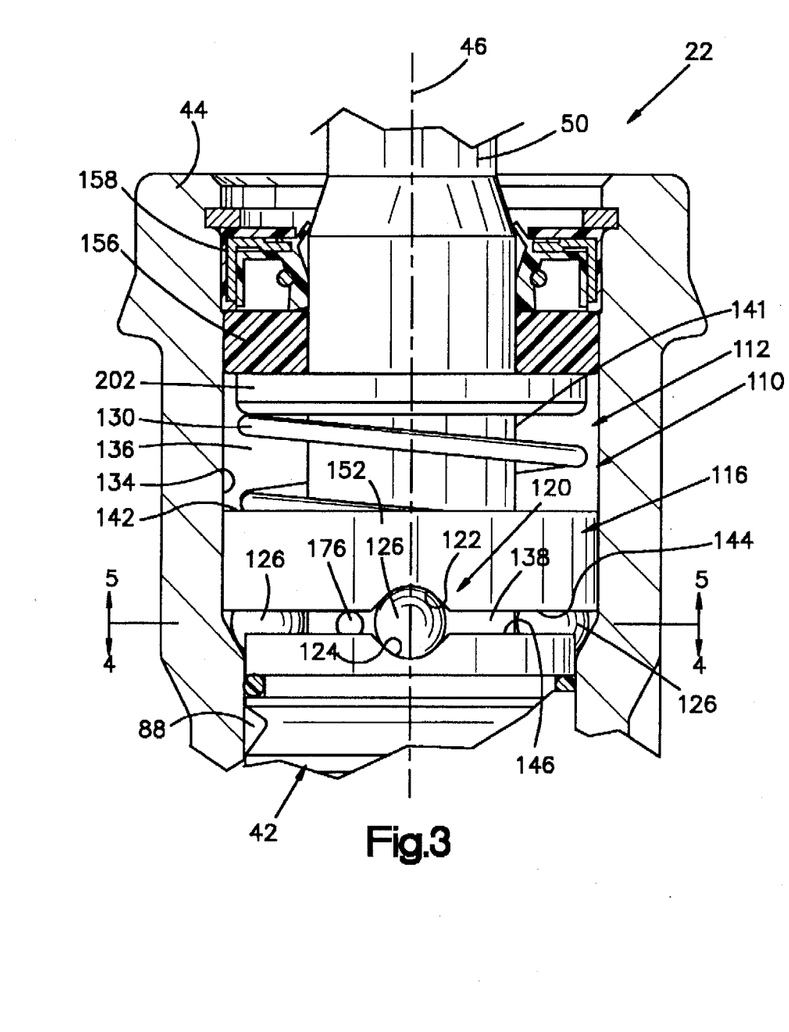
FIG. 3 is an enlarged fragmentary sectional view of a portion of FIG. 2 and illustrating the construction of a pressure responsive control unit which resists relative rotation between inner and outer valve members with a force which increases as vehicle lateral acceleration increases.
Figure 4:
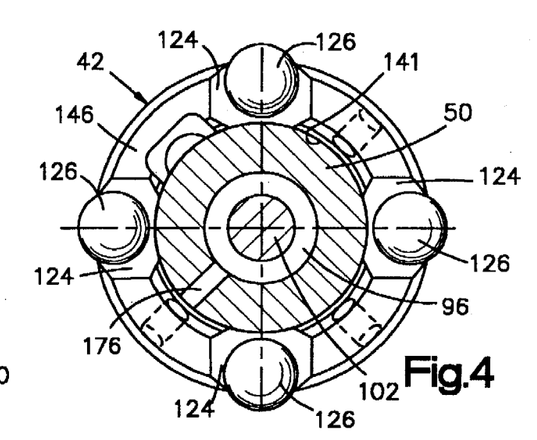
FIG. 4 is a sectional view, taken generally along the line 4—4 of FIG. 3, illustrating the relationship between a plurality of cam elements or balls and a plurality of cam surfaces formed on one end of an outer valve member.

The force transmitting member 116 is connected with the outer valve member 42 by a cam assembly 120 (FIG. 3). The cam assembly 120 includes a plurality of downwardly (as shown in FIG. 3) facing cam surfaces 122 on the force transmitting member 116, a plurality of upwardly (as shown in FIG. 3) facing cam surfaces 124 on the outer valve member 42, and a plurality of balls or spherical cam elements 126. In the illustrated embodiment of the invention, there are four cam elements or balls 126 (FIGS. 4 and 5) disposed between four pairs of cam surfaces 122 and 124 formed on the force transmitting member 116 (FIG. 5) and outer valve member 42 (FIG. 4). However, a greater or lesser number of cam elements 126 and cam surfaces 122 and 124 could be used if desired.

The force transmitting member 116 (FIG. 3) is urged axially toward the outer valve member 42 by a coil spring 130 which is disposed in a coaxial relationship with and circumscribes the valve stem 50. The downward force applied against the force transmitting member 116 by the coil spring 130 presses the cam surfaces 122 and 124 against opposite sides of the balls 126. The downward force applied against the balls 126 by the force transmitting member 116 centers the balls 126 on the cam surfaces 122 and 124.

An annular upper side 142 of the force transmitting member 116, a cylindrical inner side surface 134 of the housing 44, and a cylindrical outer side surface 141 of the valve stem 50 cooperate to partially define an annular chamber 136 which houses the spring 130. Thus, the annular chamber 136 is defined as the spring chamber 136. Similarly, an annular lower side 144 of the force transmitting member 116, the inner side surface 134 of the housing 44, and the outer side surface 141 of the valve stem 50 cooperate to partially define an annular chamber 138. The annular chamber 138 receives a fluid pressure and is defined as the pressure chamber 138. The annular chambers 136 and 138 are on axially opposite sides of the force transmitting member 116.

The fluid pressure in the pressure chamber 138 urges the force transmitting member 116 away from the cam elements or balls 126, in opposition to the spring 130. It should be understood that the force applied by the spring 130 against the annular side 142 of the force transmitting member 116 is always greater than the fluid pressure force applied against the annular side 144 of the force transmitting member. Therefore, the cam surfaces 122 on the force transmitting member 116 always remain in abutting engagement with the balls or cam elements 126.

There is a fluid sealing noninterference fit between a cylindrical outer side surface 152 of the force transmitting member 116 and the inner side surface 134 of the housing 44. There is also a fluid sealing noninterference, fit between a cylindrical inner side surface 153 (FIG. 5) of the force transmitting member 116 and the outer side surface 141 of the valve stem 50. It is contemplated that some fluid will leak from the pressure chamber 138 (FIG. 3) into the spring chamber 136. Therefore, the spring chamber 136 is connected with the reservoir 32 through a drain conduit 154 (FIG. 2). The upper end of the valve housing 44 is sealed by an annular seal ring 156 (FIG. 3) which engages the inner side surface 134 of the housing and the outer side surface 141 of the valve stem 50. A second annular seal ring 158 is provided to further ensure a fluid tight seal.

Rotation of the valve stem 50 and inner valve member 40 relative to the outer valve member 42 is resisted by the pressure responsive control unit 112 with a force which is a function of the difference between the fluid pressure force applied to the side 144 of the force transmitting member 116 and the spring force applied against the side 142 of the force transmitting member 116. As the valve stem 50 is rotated from the initial position shown in FIG. 3 toward a fully actuated position shown in FIG. 6, the outer side surfaces of the cam elements or balls 126 roll on the cam surfaces 122 and 124 as the force transmitting member 116 is rotated about the axis 46 relative to the outer valve member 42.

Figure 6:
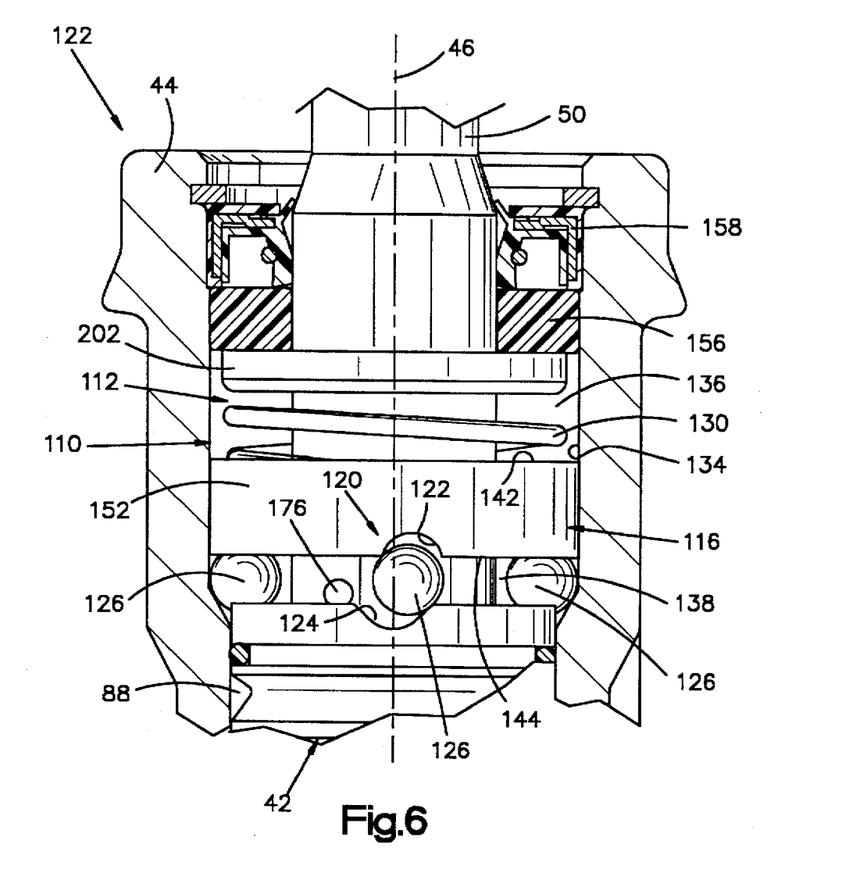
FIG. 6 is a fragmentary sectional view, generally similar to FIG. 3, illustrating the relationship between the force transmitting member, cam elements, and outer valve member when the inner valve member has been rotated relative to the outer valve member.

As this occurs, the force transmitting member is moved from the position shown in FIG. 3 toward the position shown in FIG. 6. This movement includes an axial movement (upward, as shown in FIG. 6) relative to the valve stem 50 and the outer valve member 42 against the influence of the biasing spring 130. As the side 144 of the force transmitting member 116 moves away from an annular upper end 146 of the outer valve member 42, the size of the pressure chamber 138 is increased and the size of the spring chamber 136 is decreased.

The force required to roll the spherical force transmitting elements 126 on the cam surfaces 122 and 124 and to move the force transmitting member 116 away from the end 146 of the outer valve member 42 varies as a function of the net force urging the force transmitting member 116 toward the outer valve member 42. Thus, the greater the net force pressing the force transmitting member 116 against the balls 126, the greater is the force required to rotate the valve stem 50 from the initial position of FIG. 3. The net force pressing the force transmitting member 116 against the cam elements 126 is equal to the difference between the force applied by the spring 130 against the side 142 of the force transmitting member 116 and the fluid pressure force applied by the fluid in the chamber 138 against the side 144 of the force transmitting member 116. The greater the fluid pressure force applied against the side 144 of the force transmitting member 116, the smaller is the force which must be overcome to rotate the valve stem 50 and force transmitting member 116 relative to the outer valve member 42.

A pair of spherical retaining elements or balls 162 and 164 (FIGS. 7 and 8) interconnect the force transmitting member 116 and the valve stem 50 to hold the force transmitting member 116 against rotation relative to the valve stem 50 while allowing the force transmitting member 116 to move axially relative to the valve stem 50. Also, the retaining elements 162 and 164 constrain the force transmitting member 116 to rotate with the valve stem 50. The spherical retaining elements 162 and 164 engage a pair of diametrically opposite grooves 166 and 168 formed in the valve stem 50 and a pair of axially extending grooves 170 and 172 formed in the force transmitting member 116.

There is a relatively tight, noninterference, fit between the retaining elements 162 and 164 and the grooves 166, 168, 170 and 172 formed in the valve stem 50 and force transmitting member 116 to retard the leakage of fluid from the pressure chamber 138 to the valve spring chamber 136 along the valve stem 50. Any such fluid which does leak into the valve spring chamber 136 is conducted back to the reservoir through the conduit 154 (FIG. 2). Although it is preferred to use spherical balls 162 and 164 as retaining elements, other types of connections could be used.

Figure 7:
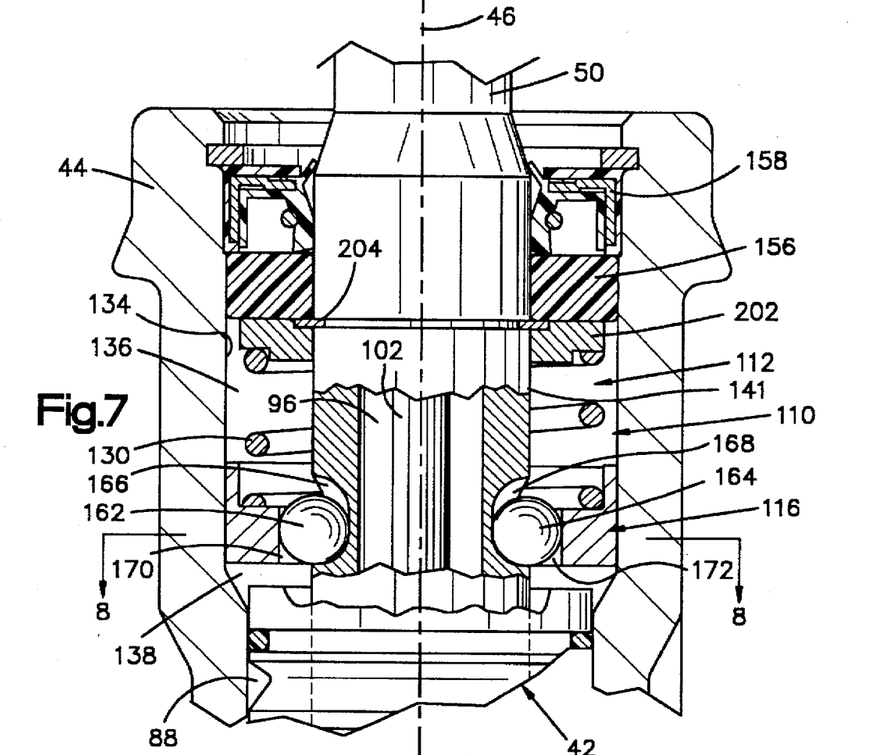
FIG. 7 is a fragmentary sectional view illustrating the relationship between the force transmitting member, a valve stem, and a plurality of retaining elements which prevent relative rotation between the valve stem and force transmitting member.
Figure 8:
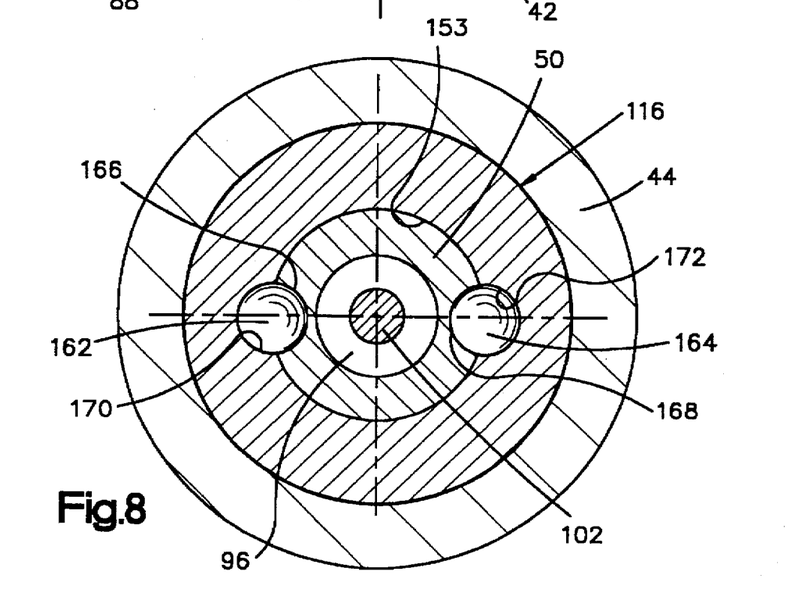
FIG. 8 is a fragmentary sectional view, taken generally along the line 8—8 of FIG. 7, further illustrating the relationship between the retaining elements, force transmitting member, and valve stem.

When the power steering control valve 22 is in the initial position illustrated in FIG. 7, the force transmitting member 116 is close to the end of the outer valve member 42. At this time, the retaining elements 162 and 164 are disposed adjacent to the ends of the grooves 166 and 168 in the valve stem 50 (FIG. 7).

Upon rotation of the valve stem 50 to actuate the power steering control valve 22, the retaining elements 162 and 164 transmit torque from the valve stem 50 to the force transmitting member 116 to rotate the force transmitting member 116 relative to the housing 44 and the outer valve member 42. As this occurs, the spherical retaining elements 162 and 164 roll upwardly in the grooves 166 and 168 formed in the valve stem 50.

Figure 5:
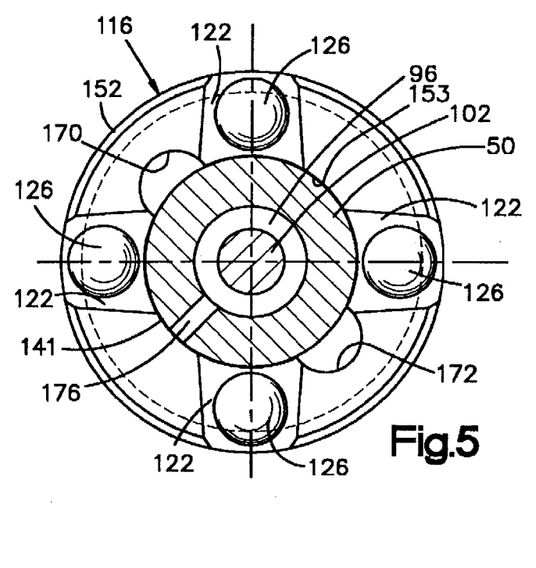
FIG. 5 is a fragmentary sectional view, taken generally along the line 5—5 of FIG. 3 and with parts omitted illustrating the relationship between the cam elements and cam surfaces formed on a force transmitting member.

As noted above, the power steering resistance control system 110 includes the lateral acceleration responsive control unit 36 (FIG. 1). Vehicle lateral acceleration (right and left, relative to the vehicle) is a vehicle operational characteristic. The lateral acceleration responsive control unit 36 is operable to vary the fluid pressure in the pressure chamber 138 (FIG. 2) of the pressure responsive control unit 112 with changes in vehicle lateral acceleration. The lateral acceleration responsive control unit 36 is connected in fluid communication with the chamber 138 of the pressure responsive control unit 112 by the return conduit 34 (FIGS. 1 and 2), the axially extending passage 96 (FIG. 7) in the valve stem 50, and a radially extending passage 176 in the valve stem (FIGS. 3-5).

The lateral acceleration responsive control unit 36 includes a housing 180 (FIG. 1) which is connected in series with the return conduit 34. A back pressure control valve 182 in the housing 180 is operable to vary the fluid pressure in the portion of the return conduit 34 between the speed responsive control unit housing 180 and the steering control valve 22. The back pressure control valve 182 includes a spherical ball or valve element 186 which is urged toward a circular valve seat 188 by a spring 190. A plunger 192 is movable in the housing 180 to vary the force applied against the ball or valve element 186 by the spring 190. The plunger 192 is moved by an output shaft 194 of a linear actuator 196. The linear actuator 196 is commercially available from Airpax, Cheshire Division, Cheshire, Conn., U.S.A. and is a model K92121-P2. Of course, other known linear actuators could be used if desired.

Movement of the output shaft 194 of the linear actuator 196 and the plunger 192 relative to the housing 180 varies the force with which a spring 190 presses the ball 186 against the valve seat 188. When the plunger 192 is in the retracted position shown in FIG. 1, the valve spring 190 is relaxed and applies a relatively small biasing force against the valve element 186. Therefore, a relatively low fluid pressure in the return conduit 34 upstream from the speed responsive control unit 36 is effective to unseat the ball 186 and allow fluid to flow to the reservoir 32. At this time, there is a relatively low fluid pressure conducted to the fluid pressure chamber 138 (FIG. 2) from the return conduit 34 through the valve stem passages 96 and 176 (FIGS. 3 and 4).

When the output shaft 194 (FIG. 1) of the linear actuator 196 is extended, the plunger 192 is moved to the left (as viewed in FIG. 1). This movement of the plunger 192 compresses the valve spring 190 to increase the biasing force applied against the valve element 186. Therefore, the fluid pressure in the return conduit 34 upstream of the speed responsive control unit 36 increases. This increased fluid pressure is transmitted to the pressure chamber 138 (FIG. 2) in the pressure responsive control unit 112.

The output shaft 194 of the linear actuator 196 positions the plunger 192 as a function of lateral acceleration of the vehicle. Lateral acceleration force occurs when direction of travel of the vehicle is changed, such as by a steering maneuver, during movement of the vehicle. For example, when the vehicle is moving forward and the vehicle operator rotates the steering wheel 18 to steer the vehicle relatively toward the left, as in a left-hand turn, an acceleration force acting on the vehicle is created. The acceleration force has a lateral component, relative to the vehicle, which acts on the vehicle in a direction toward the right. Also, when the vehicle is moving forward and the vehicle operator rotates the steering wheel 18 to steer the vehicle toward the right, as in a right-hand turn, an acceleration force acting on the vehicle is created. This acceleration force has a lateral component, relative to the vehicle, which acts on the vehicle in a direction toward the left.

In kinematics, a point, which is traveling at a speed (velocity) V and is rotating about a center point at a distance R has a radial acceleration magnitude of A, which equals:

$$V^2/R$$

Thus, if the vehicle is traveling at a velocity V and is in a vehicle turn of radius R, then the magnitude of lateral acceleration A is approximately:

$$A = \frac{V^2}{R}$$

Thus, the lateral acceleration increases when the vehicle speed increases and/or the vehicle turning radius decreases.

The acceleration module 114 (FIG. 9) includes an accelerometer 202, a filter 204, a signal conditioner 206 and an output controller 208. The accelerometer 202 is located in the vehicle to sense lateral (either right or left, relative to the vehicle) acceleration force of the vehicle. The accelerometer 202 may be a force transducer or other acceleration sensing device. Also, the accelerometer 202 may include two sensing devices. One device senses lateral acceleration toward the right, relative to the vehicle, and the other device senses lateral acceleration toward the left, relative to the vehicle.

Figure 9:
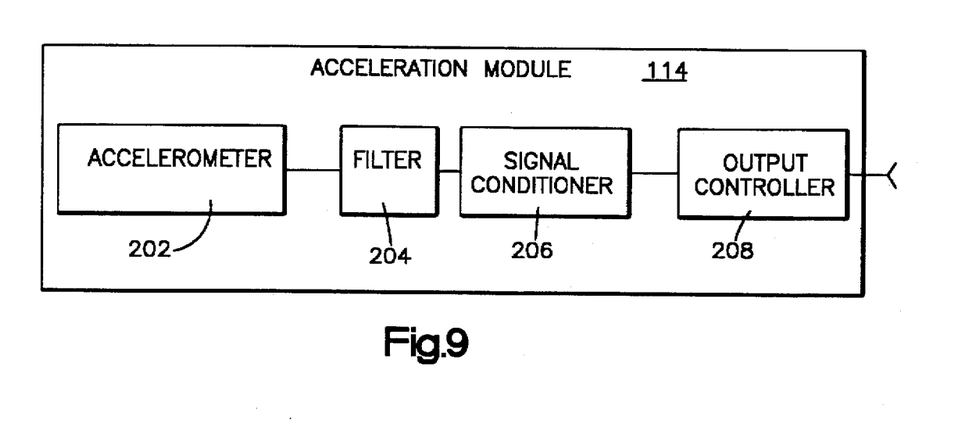
FIG. 9 is a schematic illustration of an acceleration module.

The filter 204 is connected to the accelerometer 202 for receiving a signal which varies as a function of lateral acceleration. The filter 204 removes unwanted frequency components from the signal. The removal of unwanted frequency components prevents unwanted excitation of the power steering resistance control system 110.

The signal conditioner 206 is connected to the filter 204 for receiving the filtered signal. The signal conditioner 206 processes the signal, including amplification and shaping, as necessary, to provide a signal which is usable for controlling the lateral acceleration responsive unit 36.

The output controller 208 is connected to the signal conditioner 206 and the linear actuator 196 (FIG. 1). The output controller 208 controls movement of the linear actuator 196 in response to the signal from the signal conditioner 206. At relatively low vehicle lateral acceleration, the linear actuator output shaft 194 is fully extended so that the plunger 192 compresses the valve spring 190 to a maximum extent. Therefore, at relatively low vehicle lateral acceleration, there is a relatively high fluid pressure in the portion of the return conduit 34 upstream of the speed responsive control unit 36 and in the pressure chamber 138 (FIG. 2). This relatively high fluid pressure is communicated from the lower ends (as viewed in FIG. 2) of the valve members 40 and 42 through the valve stem passage 96 (FIG. 7) and the radially extending passage 176 (FIGS. 3–6) to the pressure chamber 138. Thus, a reduced resistance is encountered in rotating the valve stem 50 and the inner valve member 40 (FIG. 2) relative to the outer valve member 42.

At relatively high vehicle lateral acceleration, the output shaft 194 (FIG. 1) of the linear actuator 196 is retracted. The plunger 192 is retracted and the spring 190 is relaxed. At this time, the spring 190 applies a relatively small biasing force against the valve element 186. This results in a relatively low fluid pressure in the portion of the return conduit 34 upstream of the lateral acceleration responsive control unit 36 and in the pressure chamber 138 (FIG. 2). Since the pressure in the chamber 138 is relatively low during relatively high vehicle lateral acceleration, there is a relatively small fluid pressure force to offset the force of the spring 130. Therefore, substantial resistance is encountered in rotating the valve stem 50 and inner valve member 40 (FIG. 2) relative to the outer valve member 42.

Upon rotation of the steering wheel 18 and the valve stem 50, the cam elements 126 exert a force on the force transmitting member 116. This force is added to the fluid pressure force in the chamber 138 to move the force transmitting member 116 from the initial position of FIG. 3. As this occurs, the spring 130 is compressed against a collar 202 (FIG. 7) which is held against axial movement relative to the valve stem 50 by a retaining ring 204.

The actuated power steering control valve 22 ports fluid from the pump 24 to the power steering motor 31 to move the rack 66 and steerable vehicle wheels 14 and 16 (FIG. 1). As the vehicle wheels 14 and 16 are turned, the rack 66 (FIG. 2) rotates the pinion 64. This in turn rotates the outer valve member 42. When the vehicle wheels 14 and 16 have been turned to an extent corresponding to the extent of rotation of the steering wheel 18 and the valve stem 50, the outer valve member 42 will have been rotated back to its initial, neutral position relative to the inner valve member 40 to cease operation of the power steering motor 31. At this time, the outer valve member 42 will also be in its initial position (FIG. 3) relative to the force transmitting member 116.

In another embodiment of the present invention, vehicle lateral acceleration can be calculated from the speed (velocity) of the vehicle and the vehicle turn radius R, which are both vehicle operational characteristics. The speed V can be determined by a sensor on the transmission of the vehicle, which provides a signal indicative of vehicle speed V. The vehicle turn radius R can be determined by a sensor on vehicle steering control, which provides a signal indicative of steering angle X of steerable vehicle wheels. The steering angle X of the steerable vehicle wheels of the vehicle is functionally related to the vehicle turning radius R, in that:

$$X = \frac{L}{R} + KA$$

wherein L is the wheel base length, K is a scaling constant and A is the vehicle lateral acceleration.

The vehicle lateral acceleration A is:

$$A = \frac{V^2}{R}$$

The steering angle X is:

$$X = \frac{L}{V^2} A + KA$$

Thus, the vehicle lateral acceleration A is:

$$A = \frac{X}{\left(\frac{L}{V^2} + K\right)}$$

Similar to the first embodiment, the signals indicative of steering angle X and vehicle speed V can be filtered and conditioned. A computing means calculates the vehicle lateral acceleration utilizing the signals indicative of steering angle X and vehicle speed V, and provides a signal indicative of the vehicle lateral acceleration. An output means provides the signal indicative of vehicle lateral acceleration to the lateral acceleration control unit 36. The lateral acceleration control unit 36 operates in the manner described for the first embodiment.

It should be understood from the above that the power steering resistance control system 110 is constructed so that it can be used in association with known power steering control valve structures with a minimum of modifications and without impeding the ability of a power steering system to be operated. In addition, the power steering resistance control system 110 does not interfere with the supplying of fluid from the pump 24 to the power steering motor 32. This enables the power steering control systems 12 to be quickly actuated to rapidly maneuver a vehicle.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for steering a vehicle comprising:
   a vehicle power steering motor;
   first and second valve members which are relatively rotatable to port fluid to said vehicle power steering motor;
   a manually operated input member fixedly connected to said first valve member to rotate said first valve member relative to said second valve member;
   means for sensing at least one vehicle operational characteristic;
   means for providing an output signal derived from said means for sensing at least one vehicle operational characteristic which is proportionate to vehicle lateral acceleration; and
   force transmitting means for resisting relative movement between said first and second valve members with a force which varies as a function of the output signal proportionate to vehicle lateral acceleration, said force transmitting means including:
   a force transmitting member connected with said first valve member and movable toward and away from said second valve member;
   means for increasing the resistance to relative movement between said first and said second valve members as said force transmitting member moves toward said second valve member;
   means for applying to said force transmitting member a force which urges said force transmitting member away from said second valve member to reduce the resistance to relative movement between said first and second valve members; and
   means for decreasing said force applied to said force transmitting member as vehicle lateral acceleration increases to increase the resistance to relative movement between said first and second valve members.

2. An apparatus as set forth in claim 1, wherein the lateral vehicle acceleration is produced during a steering maneuver and has a magnitude of approximately A which equals:

$$V^2/R$$

wherein V equals vehicle velocity and R equals radius of vehicle turn.

3. An apparatus as set forth in claim 1, wherein said means for sensing is an accelerometer.

4. An apparatus for steering a vehicle comprising:
   an input mechanism for movement in response to a steering input from a vehicle operator;
   a vehicle power steering motor;
   first and second valve members which are relatively movable to port fluid to said vehicle power steering motor, said input mechanism providing a force tending to relatively move said first and second valve members;
   force transmitting means for resisting relative movement between said first and second valve members with a resisting force which varies;
   means for sensing at least one vehicle operational characteristic and for providing an output signal indicative of the at least one vehicle operational characteristic; and
   means for controlling said force transmitting means to vary the magnitude of the resisting force in proportion to vehicle lateral acceleration in response to the signal indicative of the at least one vehicle operational characteristic and regardless of the force provided by said input mechanism tending to relatively move said first and second valve members.

5. An apparatus as set forth in claim 4, wherein the lateral vehicle acceleration is produced during a steering maneuver and has a magnitude of approximately A which equals:

$$V^2/R$$

wherein V equals vehicle velocity and R equals radius of vehicle turn.

6. An apparatus as set forth in claim 4, wherein said force transmitting means includes:
   a force transmitting member connected with said first valve member and movable toward and away from said second valve member;
   means for increasing the resistance to relative movement between said first and said second valve members as said force transmitting member moves toward said second valve member;
   means for applying to said force transmitting member an urging force which urges said force transmitting member away from said second valve member to reduce the resistance to relative movement between said first and second valve members; and
   means for decreasing said urging force applied to said force transmitting member as vehicle lateral acceleration increases to increase the resistance to relative movement between said first and second valve members.

7. An apparatus as set forth in claim 4, wherein said means for sensing is an accelerometer.

8. An apparatus comprising:
   a vehicle power steering motor;
   first and second valve members which are relatively rotatable to port fluid to said vehicle power steering motor;
   means for sensing vehicle lateral acceleration and for providing an output signal indicative of vehicle lateral acceleration; and
   force transmitting means for resisting relative rotation between said first and second valve members with a force which varies as a function of the output signal indicative of vehicle lateral acceleration, said force transmitting means including:

a force transmitting member connected with said first valve member and movable toward and away from said second valve member;

means for increasing the resistance to relative rotation between said first and said second valve members as said force transmitting member moves toward said second valve member;

means for applying to said force transmitting member a force which urges said force transmitting member away from said second valve member to reduce the resistance to relative rotation between said first and second valve member; and means for decreasing said force applied to said force transmitting member as vehicle lateral acceleration increases to increase the resistance to relative rotation between said first and second valve members.

9. An apparatus as set forth in claim 8, wherein the lateral vehicle acceleration is produced during a steering maneuver and has an magnitude of approximately A which equals:

$$V^2/R$$

wherein V equals vehicle velocity and R equals radius of vehicle turn.

10. An apparatus as set forth in claim 8, further including first conduit means for conducting fluid from a source of fluid to said first and second valve members, second conduit means for conducting fluid between said first and second valve members and the vehicle power steering motor, and third conduit means for conducting fluid from said first and second valve members to a reservoir, said means for decreasing said force as vehicle lateral acceleration increases including means for decreasing the fluid pressure in at least a portion of said third conduit means as vehicle lateral acceleration increases.

* * * * *